# 2,875,203

ALKYLTHIOPURINES

William Shive and Charles G. Skinner, Jr., Austin, Tex.

No Drawing. Application March 3, 1958
Serial No. 718,404

5 Claims. (Cl. 260—252)

This invention relates to substituted purines and more particularly to 6-(substituted)thiopurines.

The compounds of the invention can be represented by the formula

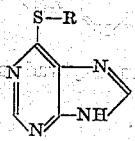

wherein R represents an alkyl radical having from 2 to 10 carbon atoms. Representative of the compounds of the invention are 6-ethylthiopurine, 6-i-propylthiopurine, 6-pentylthiopurine, 6-hexylthiopurine, 6-heptylthiopurine, 6-(2-methylhexyl)thiopurine, and 6-decylthiopurine.

The 6-(substituted)thiopurines are conveniently prepared by condensing approximately equivalent amounts of 6-mercaptopurine and an alkyl halide containing the desired carbon chain. The intermediate 6-mercaptopurine is prepared according to the method of Elion et al., J. Am. Chem. Soc. 74, 413 (1952).

The novel compounds are white, crystalline substances which are soluble in the lower alcohols and sparingly soluble in cold water. They can be dissolved in water by addition of alkali.

The 6-(substituted)thiopurines of the invention have utility in effecting plant physiology. For example, application of a compound of the invention to isolated leaf preparations causes increased leaf growth. The germination of dormant seeds can be brought about by treatment with dilute aqueous solutions of compounds included within the scope of the invention. Thus, the compounds have kinetin-like activity. The compounds are most conveniently applied to plants or portions thereof in aqueous solution or suspension, e. g., an aqueous suspension of the compound selected is treated by dropwise addition of dilute aqueous alkali until the solid dissolves; the solution is then diluted with a buffer or dilute aqueous acid is added carefully until the solution is substantially neutral. Alternatively, the selected substituted thiopurine is dissolved in a minimum amount of warm ethanol and then poured into the aqueous solution to be employed. A suspension of fine particles of the compound in the diluent results. Solutions or suspensions thus prepared can be applied by spraying or dipping and the like.

Further useful properties of the compounds of the invention are found in their inhibitory action on the growth processes of microorganisms, including bacterial and fungal pathogens. For example, 6-n-hexylthiopurine retards the growth of *Aspergillus niger* at concentrations as low as 4γ/ml. and, in concentrations of 50γ/ml. or less, inhibits the growth of the following microorganisms:

Stapyhlococcus aureus
Staphylococcus albus
Bacillus subtilis
Mycobacterium phlei
Mycobacterium tuberculosis (607)
Mycobacterium avium
Trichophyton rubrum
Trichophyton interdigitale
Corynebacterium sepodonicum
Ustilago avenae
Alternaria solani
Ascochyta imperfecta
Sclerotinia bacaticola
Verticillium albo-atrum
Glomerella singulata
Ceratostomella fimbriata 6-ethylthiopurine has been found to have the highly useful property of inhibiting sporulation of fungal organisms. For example, sporulation of *Aspergillus niger* is stopped by the compound at concentrations of 25γ/ml., thus preventing the formation of dormant spores which are highly resistant to heat sterilization and to chemical fungistatic and fungicidal agents.

These properties of the compounds of the invention are particularly surprising in view of the inability of 6-methylthiopurine to stimulate seed germination and of the general growth stimulating effect of this compound on fungi.

The following examples will more specifically illustrate the preparations and properties of the compounds of the invention.

EXAMPLE 1

*Preparation of 6-hexylthiopurine*

A solution of 6-mercaptopurine in water was prepared by admixture of 250 mg. (0.00165 mol) of 6-mercaptopurine and 31 ml. (slightly more than one equivalent) of 0.049 N aqueous sodium hydroxide. After all of the 6-mercaptopurine had dissolved, the solution was diluted with about 35 ml. of 95 percent ethanol, and about 350 mg. (0.00165 mol) of 1-iodohexane were added thereto. The reaction mixture was allowed to stand at room temperature (27° C.) for about fifteen hours, with stirring. A portion of the alcohol was then removed by evaporation, whereupon the 6-hexylthiopurine formed in the reaction crystallized and was removed by filtration.

After recrystallization from slightly alkaline, 1:1 ethanol-water solution, the 6-hexylthiopurine thus prepared melted at about 98–99° C.

EXAMPLE 2

*Preparation of 6-heptylthiopurine*

The procedure of Example 1 was repeated, except that about 375 mg. of 1-iodoheptane were employed as the alkyl halide reactant.

6-heptylthiopurine thus prepared melted at about 109–110° C.

EXAMPLE 3

*Preparation of 6-octylthiopurine*

The procedure of Example 1 was repeated using about 400 mg. of 1-iodooctane as the alkyl halide reactant, and stirring the reaction mixture for about sixty-eight hours at 27° C.

After recrystallization from 1:1 ethanol-water solution, 6-octylthiopurine melted at about 86–88° C.

EXAMPLE 4

*Preparation of 6-decylthiopurine*

The procedure of Example 1 was repeated, except that about 365 mg. of 1-bromodecane were used as the alkyl halide reactant, and the reaction mixture was heated in a stainless steel bomb for about nine hours at about 90° C. 6-decylthiopurine thus prepared melted at about 88–89° C.

EXAMPLE 5

*Preparation of 6-ethylthiopurine*

The procedure of Example 1 was employed, except that no alcohol was added to the alkaline 6-mercaptopurine solution, and about 260 mg. of ethyl iodide were used as the alkyl halide reactant.

The 6-ethylthiopurine formed in the reaction melted at about 195–196° C. after recrystallization from hot water.

EXAMPLE 6

*Preparation of 6-n-propylthiopurine*

The procedure of Example 1 was repeated, using as the alkyl halide reactant about 280 mg. of 1-iodopropane.

The 6-n-propylthiopurine thus prepared melted at about 176–177° C.

EXAMPLE 7

*Preparation of 6-n-butylthiopurine*

Example 1 was repeated, using about 305 mg. of 1-iodobutane as the alkyl halide reactant.

The 6-n-butylthiopurine thus prepared melted at about 144–145° C.

EXAMPLE 8

*Preparation of 6-n-pentylthiopurine*

The procedure of Example 1 was followed, using about 330 mg. of 1-iodopentane as the alkyl halide reactant.

The 6-n-pentylthiopurine thus prepared melted at about 110–111° C.

EXAMPLE 9

*Preparation of 6-(2-methylpropyl)thiopurine*

The procedure of Example 1 was used, except that no alcohol was added to the alkaline 6-mercaptopurine solution, and about 300 mg. of 1-iodo-2-methyl propane were used as the alkyl halide reactant. The 6-(2-methylpropyl)thiopurine thus prepared melted at about 199° C. after recrystallization from alcohol-water.

EXAMPLE 10

*Preparation of 6-(3-methylbutyl)thiopurine*

The procedure of Example 1 was used, except that no alcohol was added to the alkaline 6-mercaptopurine solution and about 330 mg. of 1-iodo-3-methyl butane were used as the alkyl halide reactant. The reaction mixture was permitted to stand at about 27° C. for about five hours and then was heated for about one hour on a steam bath.

The 6-(3-methylbutyl)thiopurine formed in the reaction melted at about 126–127° C. after recrystallization from alcohol-water.

This application is a continuation-in-part of our application Serial No. 601,614 filed August 2, 1956, now abandoned.

We claim:

1. A compound represented by the formula

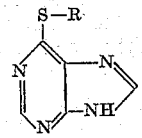

wherein R represents an alkyl radical having from 2 to 10 carbon atoms.
2. 6-ethylthiopurine.
3. 6-n-hexylthiopurine.
4. 6-n-butylthiopurine.
5. 6-n-pentylthiopurine.

References Cited in the file of this patent

UNITED STATES PATENTS 2,691,654   Hitchings et al. _____ Oct. 12, 1954

FOREIGN PATENTS 713,259   Great Britain _____ Aug. 11, 1954